April 29, 1969

H. LOPATA 3,441,716

FARE COLLECTION SYSTEM

Filed Nov. 19, 1965

INVENTOR.
HERMAN LOPATA

BY

Rauber & Lazar
ATTORNEYS.

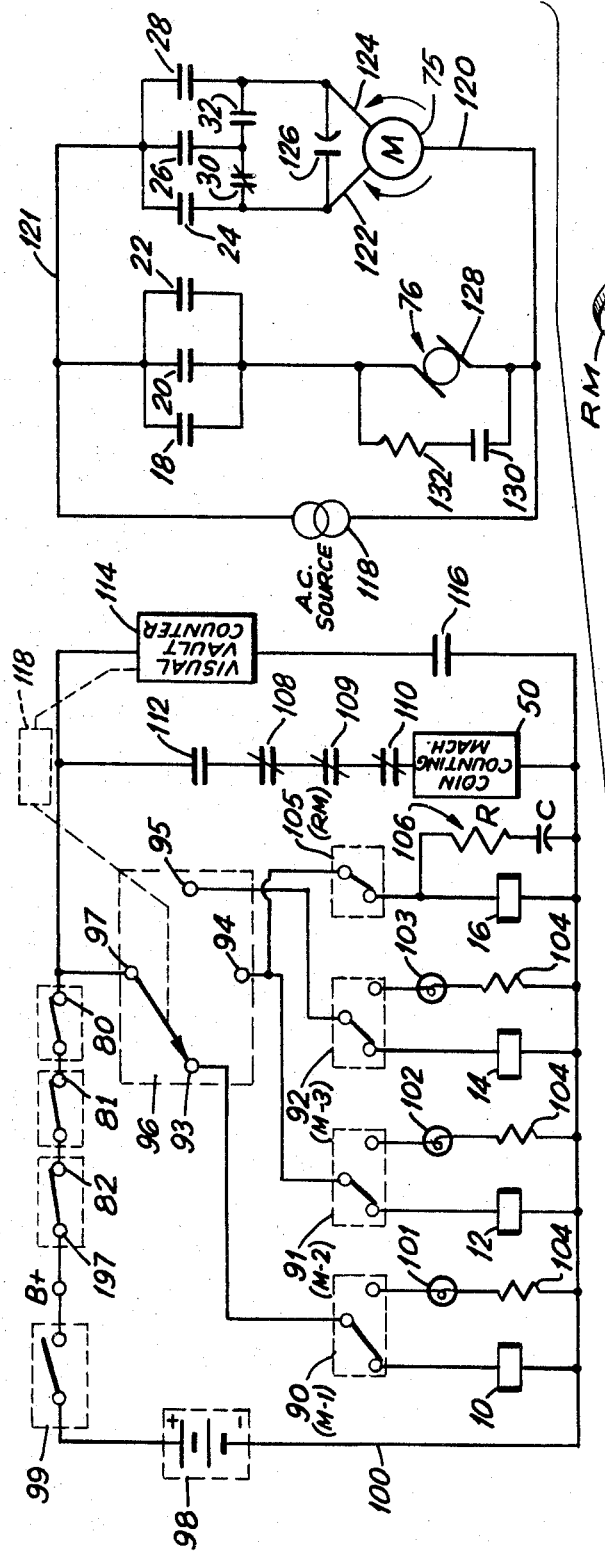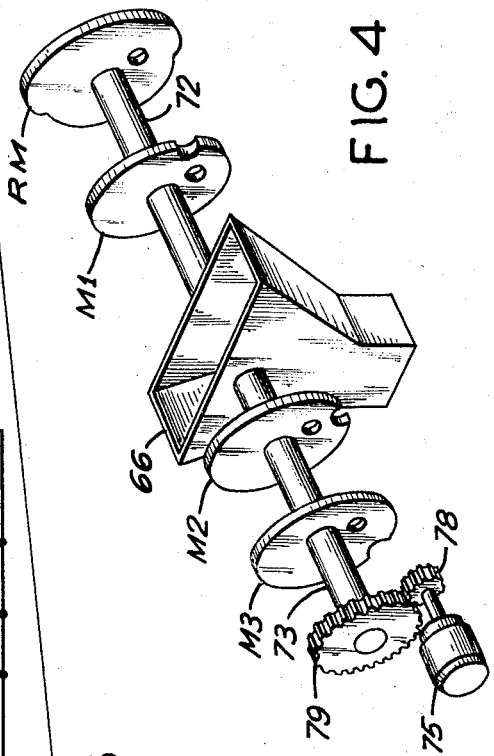

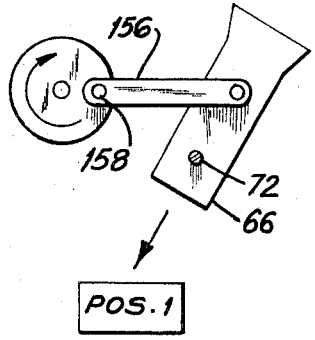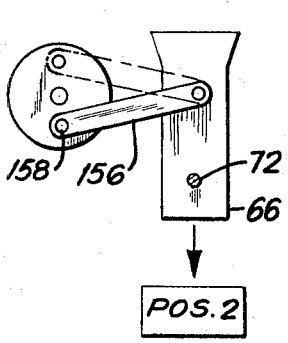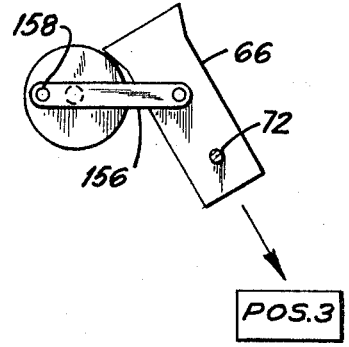
FIG.7a    FIG.7b    FIG.7c
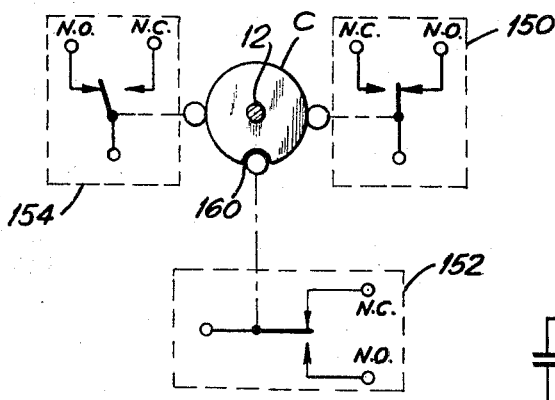
FIG.8
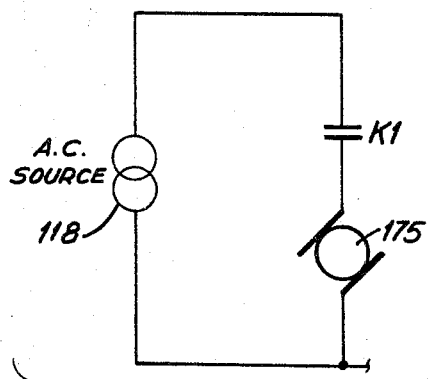
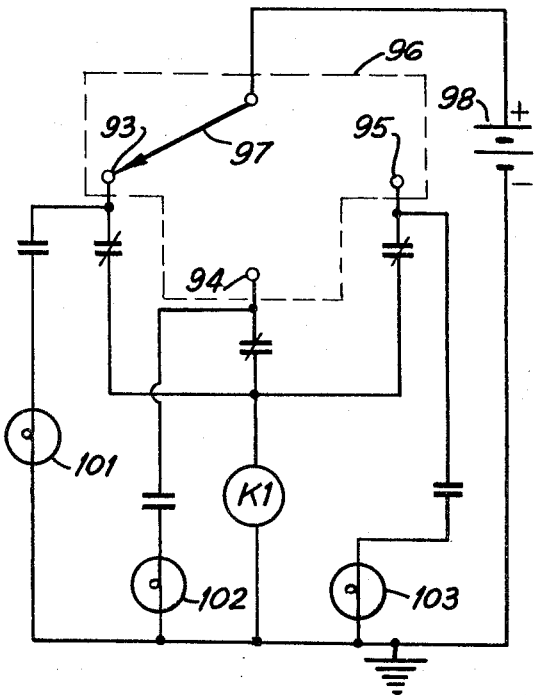
FIG.9

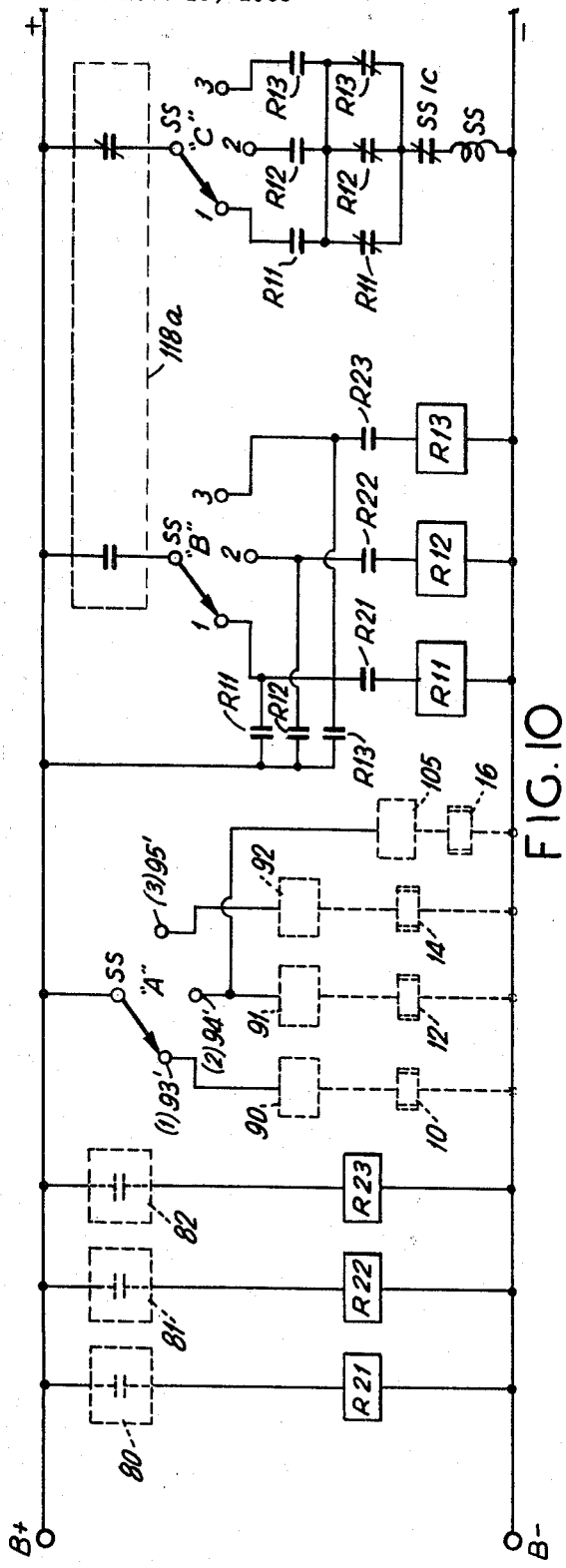
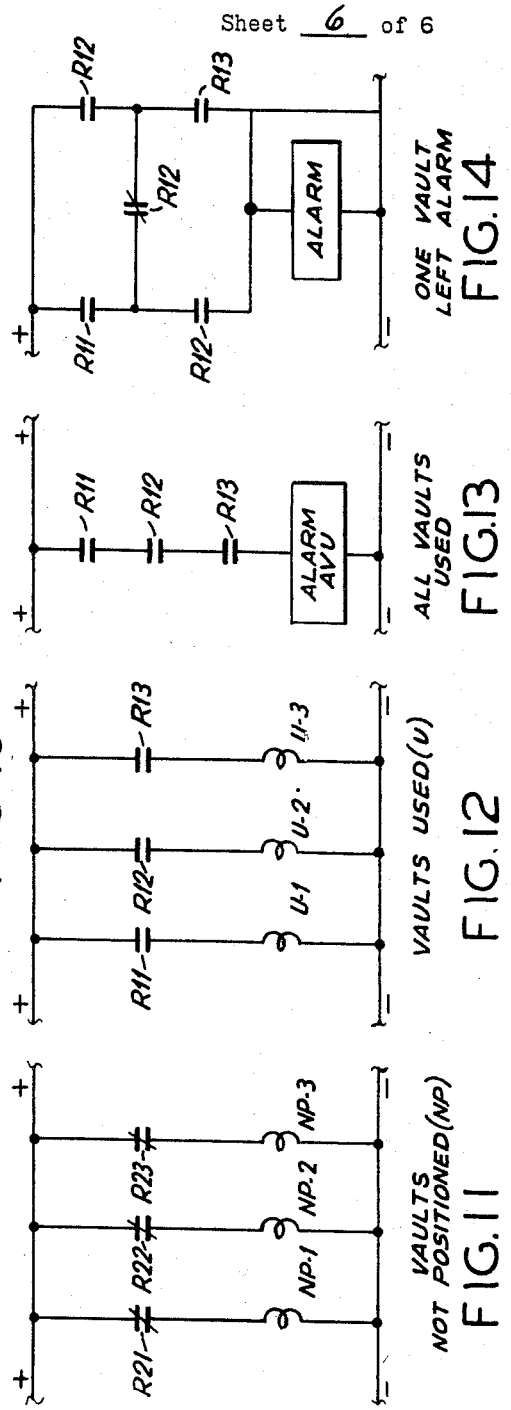

United States Patent Office 3,441,716
Patented Apr. 29, 1969

3,441,716
FARE COLLECTION SYSTEM
Herman Lopata, Bronx, N.Y., assignor to Automatic Tool Systems, Inc., Bronx, N.Y., a corporation of New York
Filed Nov. 19, 1965, Ser. No. 508,792
Int. Cl. G06c 29/00
U.S. Cl. 235—92
13 Claims

ABSTRACT OF THE DISCLOSURE

A fare collection system for receiving fares in the form of tokens or coins having a coin counting machine and chutes for carrying the deposited fares to remote vaults. The vaults are provided with switch means for indicating proper fare receiving position of the vault. When in place the vault may be selected by a selection switch means, either manually or automatically operated, for energizing a movable funnel included within the chute means to the inlet of a selected vault. The system is rendered substantially tamperproof by the interlock circuits and mechanisms of the fare collection system while any vault is out of position.

---

This invention relates to fare collection systems for toll roads and more particularly to fare collection means in such systems consisting of selecting any one of a plurality of fare receiving vaults all of which are secure from unauthorized tampering.

Present-day toll collections systems on toll roads are adapted to receive fares from patrons in the form of coins or tokens both at manually attended and automatic or unattended stations, also termed barriers. In automatic systems, the fare is handled by machines which count the value of the fare and after generating appropriate signals to allow the patron to pass on payment of the prescribed fare, the coins or tokens are allowed to pass into a receptacle or vault. More recently the fare receiving vaults are being located in below-surface locations such as tunnels and the like in order to separate the money or token collection access points from the operating points of the system which collaterally provides for better security of the cash and tokens. Furthermore, for better accounting procedures, it has become desirable to provide means for collecting the cash or tokens in vaults that can be removed from the toll collection machines with the minimum disturbance to the system during operation.

Usually, one vault is associated with each collection machine. When a cash vault in service is to be removed because it is full, or the end of a given audit period has been reached, etc., it is now necessary to stop the movement of traffic through the toll collection lane involved, while one cash vault is manually removed from the collection macihne, and a replacement empty vault is installed in its place. Such interruption in traffic flow creates congestion during certain periods.

The principal object of the invention is to provide a toll collection system arranged to receive fares in any one of a plurality of vaults.

It is a further object of the invention to provide in such a system means to assure the continuous operation of the toll collection function while a transfer of the vault receiving the fares to a selected other.

Another object is to provide automatic means for switching the deposits being received by the collecting machine from a cash vault which has been filled to the desired level or volume, to another cash vault, thus eliminating complete reliance on a supervisor or other personnel to manually cause this switching at the appropriate time.

A further object is to provide automatic means to assure that a cash vault to which deposits are being switched, is an empty vault and not one which has previously received coin deposits.

Another object is to provide automatic means for switching deposits being received by the collecting machine from one vault to another at preselected times, such that, without action by personnel, the switch-over may be programmed to occur, for example, at the end of each 8-hour period, at the conclusion of each 24-hour period, every hour on the hour; or any other depending on requirements of the auditing system.

A further object is to provide means for giving signals where switch-over is done manually, which of the multiple cash vaults is receiving deposits, at any given time, and which are empty (have not been in use), and which have been in use (have received deposits), and also to notify if a cash vault position in the housing is vacant.

Another object, where switch-over is done manually, is to provide means for alerting personnel whenever deposits in a given vault have reached a preselected level, volume, or have accompanied a preselected volume of traffic through the lane; or whenever a preselected time for vault switch-over occurs.

Still another object is to provide means, where vault switch-over is accomplished automatically, not only to give notification, but also to cause any switch-over to occur only from the vault in use to another vault which has not been in use, and to preclude any switching to a vault previously in use and still in position, or to a vault position which is vacant or in which a vault is not properly locked in position.

A further object is to provide alarm means to alert personnel whenever a switch-over is to be made to another cash vault, and there is no cash vault in position, which has not been in use to which deposits can be switched.

A further object is to provide means for automatically closing the lane to traffic in the event all vaults have been used.

According to the present invention, the toll collection system for collecting coins or tokens at toll barriers of toll highways is provided with electromechanical means for carrying such fares from the coin processing machine to any selected one of a plurality of vaults remotely situated from the coin handling machine. The fare bits are carried by chutes and channelled through a pivotal funnel adapted to communicate, depending on the pivotal position, with an inlet chute of the selected fare vault. A selector switch energizes a relay, which in turn causes a motor to pivot the funnel simultaneously with the rotation of a cam. The funnel is adapted to rotate or pivot to the desired position whereby the funnel is in communication with the chosen vault. The cam is provided with a detent for de-energizing the motor and for simultaneously indicating by a light that the funnel has been positioned according to the selection made. Interlock switches are provided to prevent the toll system from operating if any vault is removed from its position in the system. Delay means are also provided to postpone the transfer of vaults while coins or tokens are being chuted to a vault to thereby assure that no token or coin will be jammed or otherwise caught in the chute system between the coin machine and the vaults. Furthermore, means are provided for the use of low-torque motors to operate heavy, or relatively heavy, funnels and cams by the use of an electrical timer functioning to actuate a switch for energizing a magnetic clutch after a selected time has passed allowing the motor thereby to produce sufficient starting torque to operate the relatively heavy apparatus.

In a modified form of the invention, means are provided for automatically programming the vault selection according to a time schedule, a count of vehicles or any desired indicia needed for accounting purposes.

These and other objects of the invention as well as certain advantages and features will be better appreciated and understood from a detailed description of a preferred form of the invention as presently contemplated.

Referring now to the drawing, together with the following detailed description of several preferred forms of the invention wherein:

FIG. 4 is a schematic, in perspective, of the cam arrangement of one embodiment of the invention;

Figure 5A:
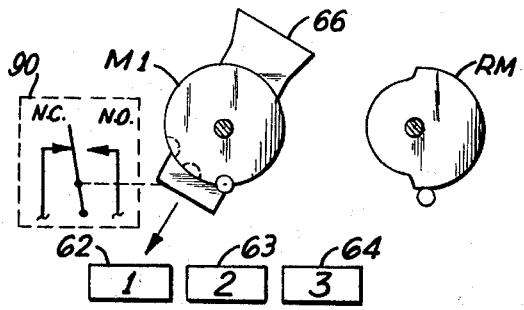
Figure 3:
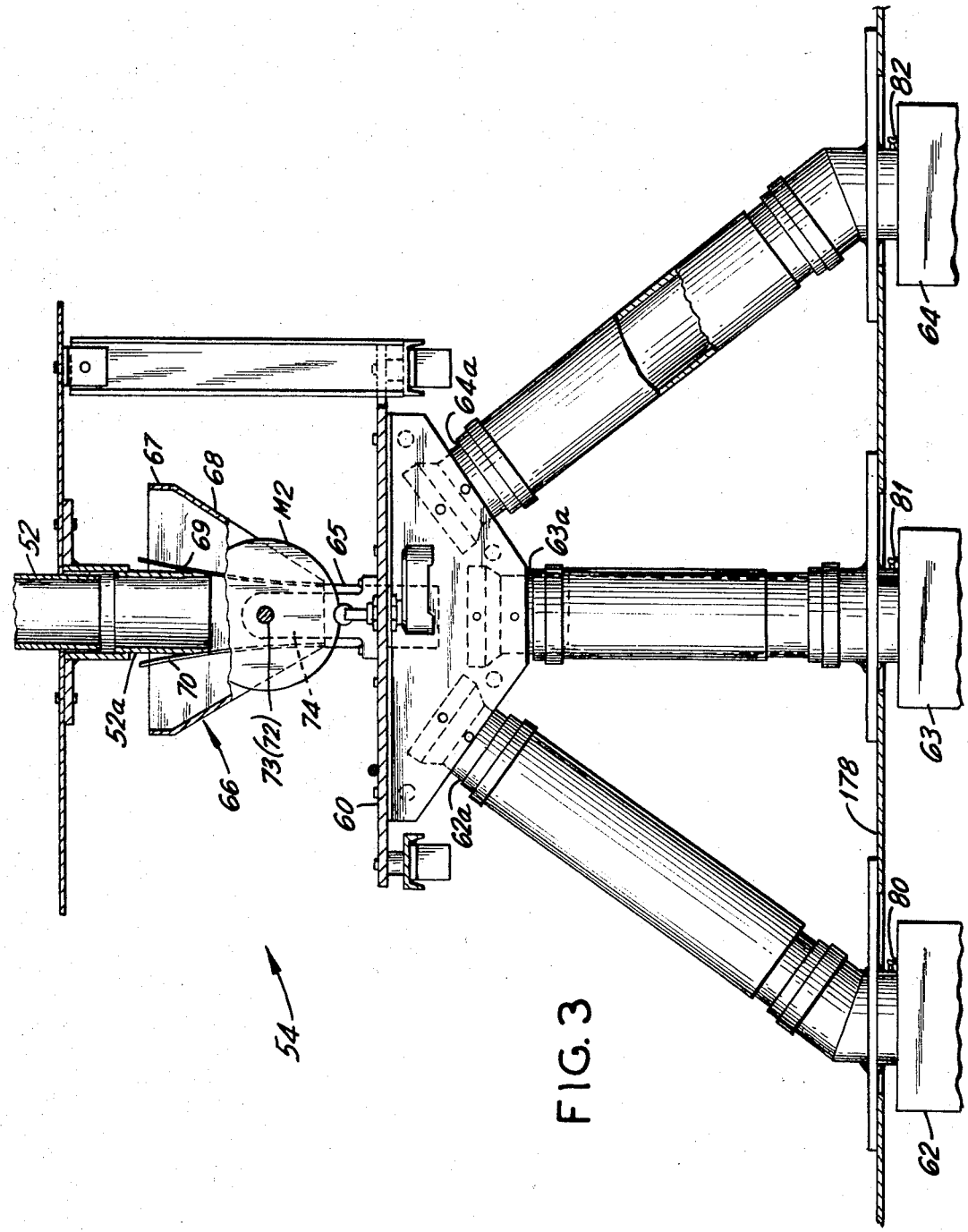
FIG. 3 is a side elevation partly in section of the control mechanism of FIG. 2 as seen along line 3—3.

FIGS. 5a, b and c, respectively, illustrate diagrammatically the operational sequential relation of the cams in FIG. 4;

FIG. 6 is an electrical schematic of one form of the control circuit of the invention;

FIGS. 7a, b and c, illustrate in schematic form a modification of the chute mechanism illustrated in FIG. 3;

FIG. 8 is a schematic diagram illustrating a single cam used in the modified form of the invention;

FIG. 9 is a schematic diagram of the electrical connections for the modified form of the invention.

FIGS. 10–14 are schematic diagrams of the electrical connections for another modified form of the invention for automatic programming.

Figure 1:
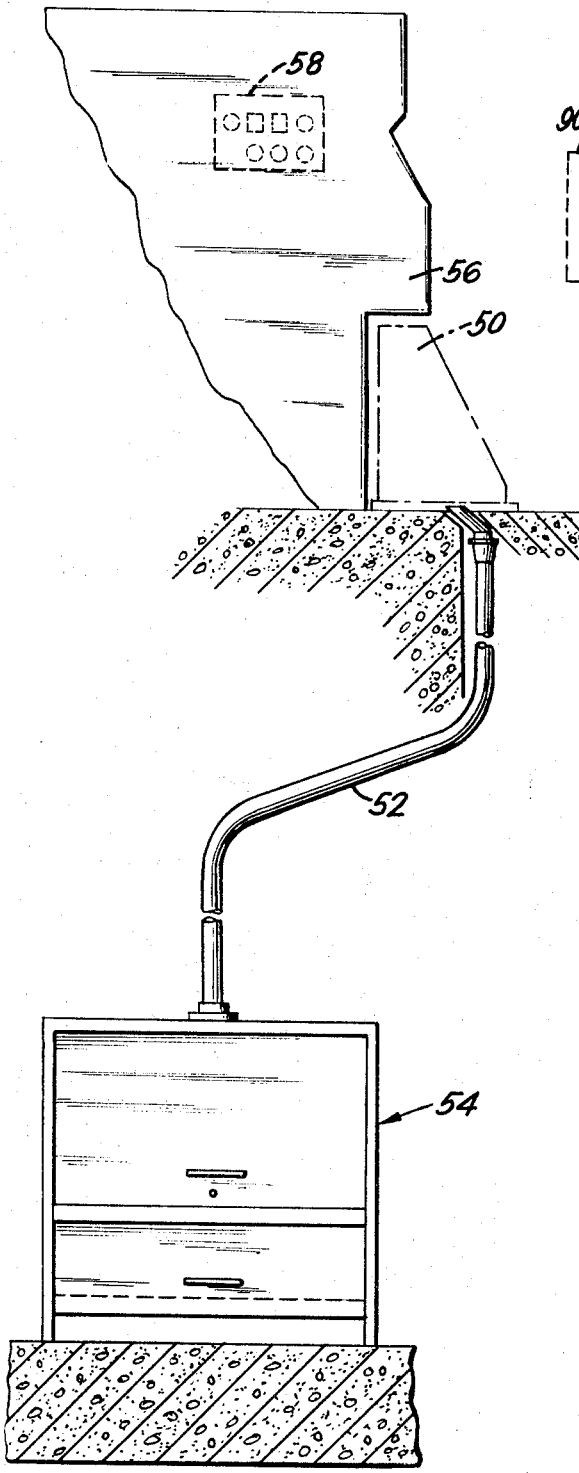
FIG. 1 is a schematic elevation of the main components of the toll collection system.

Referring now to the drawing, the toll collection system comprises, as illustarted in FIG. 1, a toll booth 56 disposed in the path of vehicles passing along a toll highway. A coin machine 50 of the type such as described in Patent No. 3,128,038, issued on Apr. 7, 1964, to G. L. Grant et al., receives coins or tokens deposited therein by the patron or the attendant at the toll booth. The fare is passed after processing by the machine in a chute 52 conveying the token or fare to a vault located beneath the toll road as indicated by reference 54. A panel 58 in the toll booth includes switches, indicator lights, transaction and money counters and the like, used by the attendant or supervising personnel for the operation of the toll collection system. Panel 28, of course, can be located at a centralized administrative building.

The control mechanism is enclosed within housing 54. A horizontally oriented mounting support 60 carries the control mechanism above the cash vaults 62, 63 and 64.

Centrally disposed on the support panel 60 is the funnel assembly 66 adapted for pivoting about shaft 72–73. The funnel assembly 66 carries tokens or fares from the exit portion 52a of the main chute from the coin machine 50. The funnel assembly includes an open-ended rectangular upper portion 67 smoothly formed into the tapering portion 68, which in turn, is smoothly formed into an elongated rectangular portion 65 extending through a slot in the panel 60. The slot is dimensioned sufficiently to provide for a swing of the funnel assembly perpendicular to the axis of the shaft 72–73 to cooperate with the upper open ends of the chutes 62a, 63a, 64a, respectively of the cash vaults. An electric motor 75 is adapted to rotate the shaft 72–73 by connection through a pinion 78 and gear 79 fixed to the end of the shaft 72. The electric motor 75 is provided with a clutch and timer assembly 76, of any well-known type, functioning to engage the motor to the pinion and gear after a prescribed, pre-set time has elapsed, sufficient to allow the low torque motor 75 to operate the control mechanism.

The shaft 72–73, in addition to pivoting the funnel assembly, also rotates a plurality of disc-shaped cams each corresponding to a cash vault. According to this form of the invention, there are provided three such cams corresponding to the three cash vaults. The cams M1, M2, and M3 are fixed on the shaft 72–73 for rotation about the shaft and a cam RM is also so mounted on the shaft 73. Beneath an auxiliary shelf 178 the cash vaults 62, 63, 64 are located with an appropriate enclosure means secured by keys or the like, not shown. A switch, indicated by references 80, 81, and 82, is provided within each of the vault enclosures to provide an electrical contact when the respective cash vaults are properly seated within the enclosures. Upon the removal of any cash vault from the enclosure, the respective switches are actuated to perform a signal function to be described.

Figure 5B:
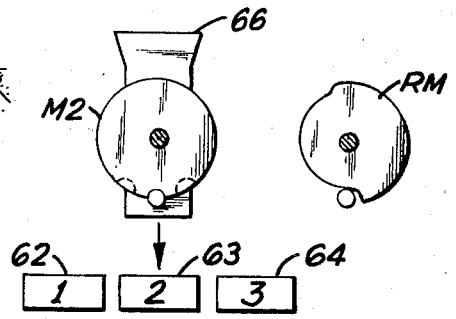
Figure 5C:
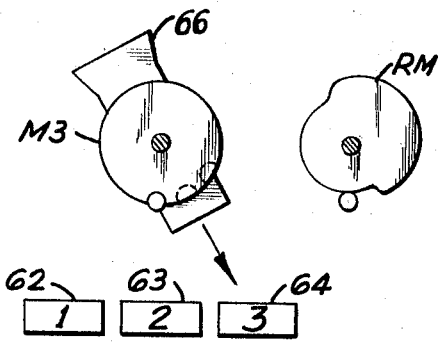
Figure 2:
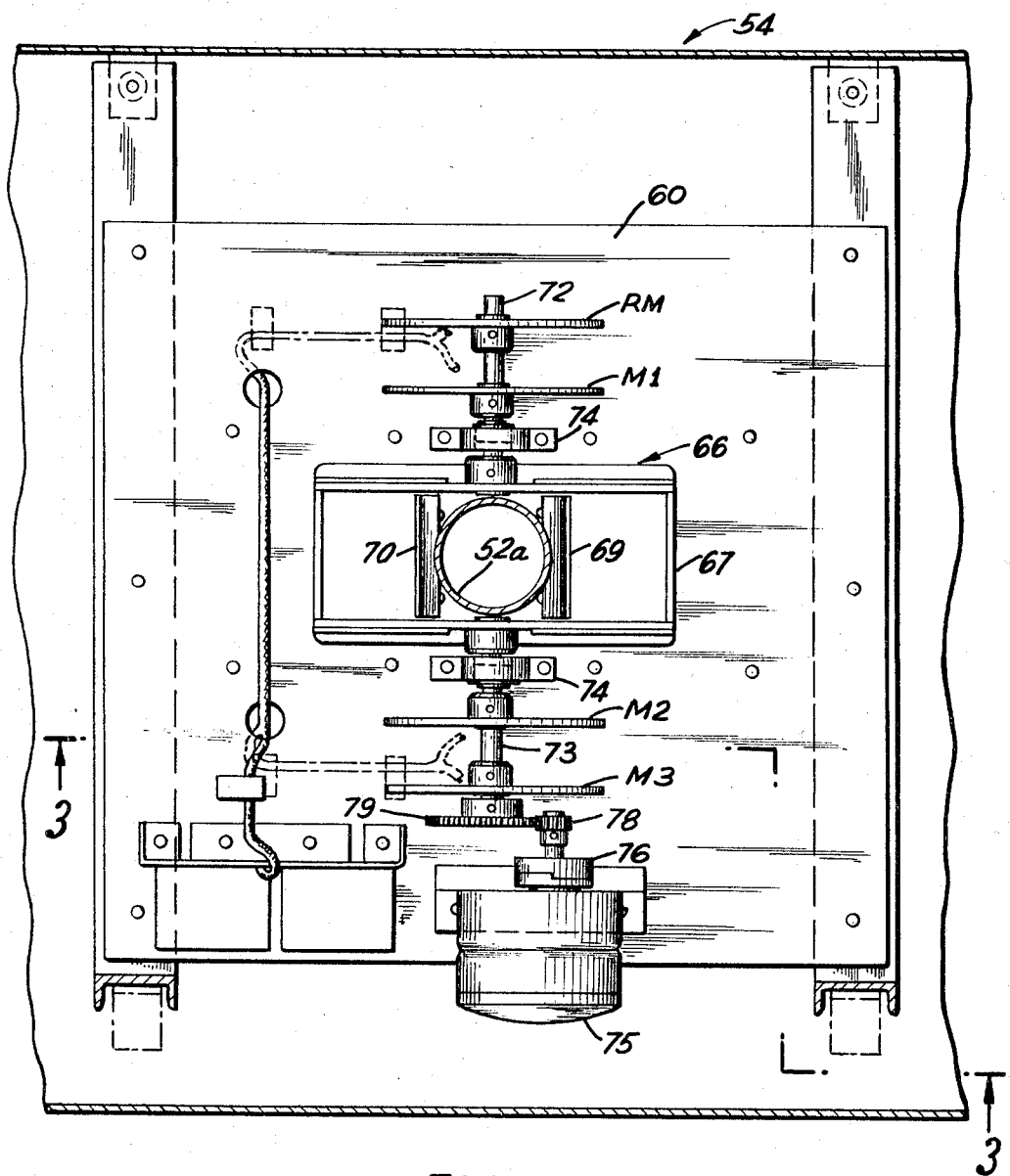
FIG. 2 is a top view of the control mechanism of the fare guiding means.

The cams are arranged on the shaft 72–73 to correspond the spatial position of the funnel assembly with respect to the cash vaults. A detent in each of the cams M1–M3 is oriented on the shaft to correspond identically with the attitude of the funnel assembly as shown by the perspective schematic of the cams relative to the funnel assembly in FIG. 4. Mounted with each cam is a switch assembly, schematically shown in FIG. 5a, for cam M1, adapted to cooperate as a cam follower with the respective cams to transfer the common swinger of the switch from one contact (NO) to another contact (NC) for a switch function to be described. It will be noted that the normally open NO contacts are closed while the cam follower is riding on the circular or high portion of the cam, and that the normally closed NC contacts become closed when the cam follower falls into the recess or detent portion of the cam. FIGS. 5a, 5b, 5c show, respectively, the position of funnel 66 with respect to the cash vaults 62 or (1), 63 or (2), and 64 or (3), respectively. At the right side of the cams, for convenience, there is shown the relative orientation of the cam RM and its switch cam follower with respect to the position of each of the operative cams. It will be noted that the cam follower rides on the outer or circular portion of cam RM only when the funnel assembly is in the first or most clockwise position, position 1 for vault 62, and that the cam follower rides within the inner or detent portion of cam RM for the other positions of the funnel.

Referring now to the schematic diagram of the system, FIG. 6, representing in simplified form the electrical connections of the several parts of the system, there is provided the windings of relays 10, 12 and 14, in series circuit with the NO contact of switches 90, 91 and 92 of the associated cams M1, M2 and M3 respectively. The common contact C of the respective switches is connected to the wiper contacts 93, 94 and 95 of the vault selector switch 96 mounted in the toll booth 56. The swinger or common portion 97 of the selector switch 96 is connected to the battery supply through the normally closed interlock switches 80, 81, and 82 of the cash vault housing referred to above (see FIG. 3). The battery supply lead 97 is connected to a battery source 98 through a main power switch 99 mounted in any convenient place, such as the panel 58 in the toll booth 56 or in some appropriately designated location, for security purposes, remote from the non-supervisory operating personnel. The negative supply terminal of the battery 98 is connected as shown in the drawing by lead 100 to the opposite ends of the windings of relays 10, 12, and 14, reversing relay 16. The normally closed (NC) contact of the cam switches is connected in series respectively with an indicator lamp 101, 102 and 103 mounted, for example, on the control panel 58 in the toll booth to indicate, as will be described, the vault oriented to receive the fares. If necessary, an electrical resistance ballast 104 or the like, well-known in the art, may be provided.

The RM cam switch 105 is connected in circuit with the wiper contact 94 of the vault selector switch 96 through its NO contact with the winding of relay 16 returning to the negative of the battery through lead 100 as shown. An RC network 106 is connected across the winding of relay 16 to serve as a holding circuit to effectively maintain the operation of the relay 16 during transition of the switch 105 from closure to open or, open to closure thereby obviating possible oscillation of motor 75.

In series with the power source to the coin machine 50, normally closed contacts 108, 109, and 110 of relays 10, 12, and 14 respectively, are arranged in series with coin switch 112 of the coin machine functioning as interlocks to the machine to thereby prevent the coin handling function including the counting of the coins while the funnel is being repositioned to feed coins or tokens from one of the cash vaults to a selected other. An electrical counter 114 provided with visual indicators of the total cash or transactions is shown connected in series relation with a switch 116. The counter reflects the total moneys received or the total transactions collected by the passage of vehicles through the toll barrier. In such a system the switch 116 would be a treadle switch in the road bed or the output switch of a photo-electric counting circuit.

The embodiment of the invention being described is one which is monitored and programmed on a manual basis. According to this embodiment the coin funnel is repositioned at the will of the operator by the operation of the vault selector switch 96. It will be appreciated by those skilled in this art that the normally operated vault selector switch 96 may be operated automatically according to some pre-set program determined by the counter 114. Accordingly, for such a system, the vault selector switch is shown in circuit with a control circuit 118 with the counter 114. According to such an operation when the counter 114 reaches a certain predetermined value, for example, 1000 vehicles, a switch will close the control circuit 118 to effect a transfer of switch position 96 from wiper contact 93 to 94. A preferred automatic system is shown in FIGS. 10–14 to be described later.

The motor 75 is a bi-directional alternating current motor of relatively low torque capabilities. Accordingly, its torque producing abilities are limited by the inertia of the cams and of the funnel assembly. This circuit obviates the low-torque limitation. The motor 75 is conected across one leg of an AC source 118 by lead 120. The direction-controlling leads 122 and 124 of the motor are connected to a capacitor 126 which in turn is connected in parallel with the normally closed contact 30 and the normally open contact 32 of reversing relay 16. The normally open contacts 24, 26, and 28 of the control relays 10, 12, and 14 respectively, are connected to the motor network as shown, the common contacts of which are jointly connected to the AC source 118 by lead 121. Depending on the motor manufacturer's designation, the contact switches of the control relays as just indicated are, as will be appreciated by those skilled in the art, arranged to energize the motor 75 to operate either in a clockwise or counterclockwise direction as indicated by the arrows as desired. The clutch and timer mechanism 76 is connected in parallel circuit with the motor circuit and comprises a timer 128 in series with the parallel open contacts 18, 20, and 22 of the control relays 10, 12, and 14, respectively. The normally open contacts 130 of the timer 128 is arranged in series with the winding of a clutch 132. When the timer 128 has cycled to the preset time desired, for example, fifty milliseconds, the switch 130 is closed, energizing clutch winding 132 which in turn, connects by clutch action, the output of the motor 75 to the gear train and shaft 72.

*Operation—manual*

Assuming that the vault in operation is the first, designated as 62, and it is now desired to transfer the funnel to vault position No. 2 (vault 63), it will be observed that the relays are all down, that is, de-energized, and that the indicator lamp 101 is lit indicating that the system is supplying coins or tokens to the first vault 62. Upon rotation of the selector switch 96 from the No. 1 to the No. 2 position, wiper contacts 93 to 94, relay winding 12 corresponding to the second vault position 63 will be energized through the normally open contact NO of the cam switch 91. It is noted that cam switch 90 is shown in its normally closed NC position as shown in FIG. 5a, since the cam follower is in the cam detent when the funnel is in position 1. Relay 12 now becomes energized closing its contacts 20 and 26 and opening its normally closed contact 109 thereby rendering inoperative the coin operating function of coin machine 50. Contact 20 closed, energizes timer 128 and energizes the motor 75 through contact 126. Since the clutch is not engaged the motor rotates without any rotation of shaft 72. After several milliseconds the clutch becomes engaged to the motor by energization of clutch coil 132. The motor rotates shaft 72 in a direction to change the funnel and cam system from that as indicated by FIG. 5a to that indicated by FIG. 5b. Accordingly, it will be appreciated that the detent of cam M1 has been displaced to close the normally open contact of switch 90 (first vault), and to close the normally closed contact of switch 91 (second vault) to thereby de-energize relay 12 and energize the indicator light 102. At the same time, light No. 1 (101) is extinguished. Since the funnel assembly 66 is rigidly connected to the shaft 72, rotation of the cams correspond identically to the rotation of the funnel assembly. Accordingly, as the cam shaft is rotated, the funnel assembly is rotated, as shown by FIG. 5b, to connect the token and coin chute 52 from the coin machine 50 through the chute system 63a to the cash vault 63. Within the funnel assembly there is provided a pair of flexible plates 69 and 70 which follow the movement of the funnel and resiliently press against the outlet walls of tube 52a to guide the tokens or fares without being caught or snared in the chute system by the movement of the funnel.

As relay 12 becomes de-energized its contact 26 opens thereby de-energizing the motor 75 terminating movement of the funnel assembly and the cams.

The operation of the funnel assembly from position No. 2 to position No. 3 or back to position No. 1 should be understood without a detailed description. It will be noted that if it is desired to transfer the funnel position from No. 3 to its No. 1 position, the system and circuit functions do this automatically, the motor 75 being reversed in operation to pivot the funnel from position No. 3 to position No. 1 by rotating in a clockwise direction.

It will be noted that in addition to using a timer and clutch mechanism for delaying the loading of the low-torque motor to the shaft 72, the delay of rotating the funnel system is beneficial in allowing any coins or tokens in transit from the coin machine to the vault from being trapped or otherwise kept from passing into the correct vault by the delay allowing thereby the fare to be collected in the last vault. The next fare is kept from being processed by the interlock of the normally closed contacts of the control relays. It wil be appreciated that the vault transfer function is quiescent while all the control relays are down or inoperative. Thus relays 10, 12, and 14 are down when the funnel is fully seated in position and is not moving. Under such circumstances, which is normal for the toll collection function of the system, the coin machine 50 is rendered operative to perform its function of processing the fares.

A modified form of the invention contemplates the use of a uni-directional motor, that is, a motor which operates to rotate in a given direction, but not the other. In the above-described form of the invention, the motor 75 never in fact makes a complete revolution since it merely rocks the shaft 72 back and forth about the center position as the fare funnel is changed from the center position to either of the positions about the center.

Referring now to FIGURES 7, 8 and 9, there is shown in schematic form a system using a uni-directional motor 175 in place of the motor 75 above described. The motor is operated by the normally open contacts K1 of a motor relay K1 operated in series across a DC circuit having battery 98, with any one of the normally closed (NC) contacts of the single cam switches 150, 152, and 154 as shown in FIGURE 8. The respective indicator lights 101, 102, and 104 are in circuit with the normally open (NO) contacts of the corresponding cam switches. The operation of the circuit will be appreciated by referring to FIGS. 7a, 7b and 7c in conjunction with FIGURE 8. The funnel assembly 66 is connected by an eccentric link 156 to an eccentric connection 158 on the shaft of the motor. A single cam C, the only one necessary for this embodiment, is mounted to the shaft 72 and rotates, accordingly, synchronous or in proportion with the funnel assembly 66. The single detent 160 on the cam C is oriented on the shaft 72 so that switches 150, 152 and 154 are operated respectively in correspondence with the position of the funnel for feeding coins or tokens to the vaults 62, 63, and 64, to effect the same result as that indicated by FIGURES 5a, 5b and 5c described above. This is carried out by arranging the cam switches so that the cam follower in the detent causes the NC contacts to be closed when the cam is in the position selected on the vault selector switch 96 and the NO switch is thereby opened. Thus, to transfer the funnel from position 1 to 2 the switch is rotated to position 2 to cause the wipe to engage wiper contact 94. The NO contact of switch 154 being closed since the cam follower for that switch is riding on the high portion of the cam energizes the K1 relay thereby energizing motor 175. Motor 175 operated, rotates the link 156 clockwise from the position shown in FIG. 7a to that shown in FIG. 7b, pivoting thereby, the funnel 66 from vault position 1 to position 2. Shaft 72 also rotates cam C so that detent 160 transfers switch 150 from NC to NO closure and causes switch 152 to close its contacts NC and open its contacts NO thereby de-energizing the motor relay K1 and motor 175 and lighting indicator light 102.

In a similar manner the circuit operates to transfer the funnel position from one position to any other position as desired. The motor control circuit including relay K1, is shown without any time delay or clutch features. However, if desired, it should be apparent to those skilled in this art that a time delay and clutch means can be incorporated in the modified form of the invention in accord with the comparable means illustrated in the embodiment shown by FIGURES 1–6.

It will be appreciated also that the funnel assembly 66 shown schematically in FIGURE 4 arranged for pivotal movement on shaft 73 can be, if desired, translated linearly relative to the collection system. In such an arrangement, the position of shaft 73 is used as input information to pinions and gear trains to translate the funnel 66 horizontally over the inlets to each of the vaults 62, 63, etc. The coin chute 52 is kept in fixed position as above, while the funnel 66 is moved beneath it and guides coins therefrom into the vault over which the funnel is then positioned.

Automatic system

Referring now to FIGURE 10 there is shown a schematic diagram of a circuit that provides automatic programming of the vault selector control according to a preset sequence. Vault contacts 80, 81, and 82, are as described above, in that they are normally open as shown when related to an unused vault out of position. When a vault 62, 63, 64, etc., is placed in position, the corresponding switch closes and energizes its corresponding slave relay R21, R22, R23. Relays R21, R22, etc., provide a plurality of contacts for use as operating means of the various circuit features of this embodiment. A three-deck stepping switch SS serves as a one-cycle "ring counter" to select automatically each vault circuit next available according to the program desired. The first deck A corresponds to the "manual selector switch" portion of FIGURE 6, the operation of which being identical to that for the manual embodiment whereby the motor 75 is operated to rotate the cams and funnel 66.

Relays R11, R12 and R13 are connected in series to the switch positions 1, 2, and 3, of the B deck of SS switch through normally open contacts of slave relays R21, R22, and R23. These relays when operated lock up through their own normally open contacts R11, R12, and R13. Deck C of SS switch is connected to the solenoid SS of the stepping switch through a network of normally open and normally closed contacts of relays R11, 12, and 13 and the usual interrupter contact SSIC to advance the stepping switch from position to position, in the well-known step-by-step manner. Timer or counter contacts 118a comprise a well-known C contact whereby a common swinger is in contact with one or another switch contact as shown, the normally open portion being connected in circuit with the wiper arm of B deck and the normally closed contact to the wiper arm of deck C. Contacts 118a operate to provide two impulses, one each respectively to decks B and C in response to a pre-set time from a clock, a pre-selected count such as from a counter of vehicles, or from a device responsive to the amount of coins in a vault. The means for causing such an impulse are well-known and any available devices needed for the program desired may be used as will be apparent to those skilled in this art.

In operation, vaults 1, 2, and 3, are in position closing contacts of relays R21, R22, etc., are arranged in series and R23 are operated. Assuming that the system is channelling coins to vault 62, corresponding to position 1, an impulse from the timing or counting circuit 118a in accord with the chosen program, closes the contact to wiper of deck B. Relay R11 then operates and locks up through its contacts R11. The contacts of 118a at the end of the impulse drop to the normally closed position establishing an operating path for solenoid SS through operated contacts R11 and either of the normally closed contacts of unoperated relays R12 or R13 and the normally closed interrupter contacts SSIC. Solenoid SS energized advances the switch SS from position 1 to position 2 which rotation in turn establishes an operating path through deck A for relay 12, as explained for FIG. 6, through cam switch M2 (91). Relay 12, operates as previously described to rotate funnel 66 to channel the coins to the second vault position, i.e., into vault 63. If vault 63 is not in place or has been used as would be indicated by relay R12 being operated, stepping switch SS will advance from position 1 to position 3 in the known manner, whereby relay 14 will be energized as A-deck wiper contacts position 3 (95′) through the closed cam switch M-3 (92).

After vault 3 has been used, the timer contacts 118a will close to operate relay R13. Since all the vaults will now have been used, the stepping switch cannot advance since there will be no operating path to the SS solenoid.

A series circuit of a closed contact of relay R11, R12, and R13, with an alarm circuit such as a bell, light or the like, is shown in FIGURE 13. Operating personnel are thereby apprised of the condition that all vaults have been used. Replacement of any one of the vaults 62, 63, etc., with an unused one will thereby open the operating path of the associated slave relay R21, R22, etc., and thereby release the corresponding relay R11, R12, etc. The latter relay on being released thereby establishes an operating path of the SS solenoid through the C deck of switch SS. The switch SS then completes the cycle until it positions itself at the position of the vault that has been replaced. The operating path for coil SS was, it is noted, opened by all three R11, R12, and R13, relays up. When one of the three dropped, switch SS could again complete its cycle. The motor 75 is accordingly, operated to rotate the funnel 66 to the orientation needed to guide the coins into the unused vault as has been explained previously.

It is desirable to indicate that if a vault has not been properly positioned, the circuit of FIGURE 11 provides a visual indication of such a condition. The normally closed contacts 80, 81 and 82 whereby slave relays R21, R22 with an indicator lamp, NP1, NP2, etc., which will be lit when the slave relay is not operated. It is of course understood that the normal and usual operating condition is a vault in position at all times, except when one is being replaced.

The circuit of FIG. 12 provides a means for indicating at all times which vault has been used or is being used. Since relays R11, R12, etc., lock up upon its first operation, indicating that the vault corresponding to it has received coins, the normally open contacts of these relays are arranged in series with a pilot lamp or the like, to indicate the operation of that relay, which is positive indication that a vault is used or is in use.

In order to advise the operating personnel that the last available vault is now being used, the circuit of FIGURE 14 functions to provide an alarm signal when any two of the three vaults relays R11, R12, or R13 have been operated. It is noted that this circuit is arranged to assure such an indication regardless of which two are used or in whatever sequence they were used.

Various other operating functions will be apparent to those skilled in this art, according to the needs desired. Thus, the automatic programming circuit of FIG. 10 can be provided with an interlock circuit to render the control circuits of a lane inoperative if at least one vault is not properly operating to receive coins. Such a circuit was described above for the manual controlled circuit of FIG. 6 wherein the vault switches 80, 81 and 82 are shown arranged in series circuit with the control circuit. It is believed that such an arrangement for the automatic circuit will be apparent to those skilled in this art.

In order to provide increased security over the disposition of the vaults, a vault 62 may be arranged so that its switch 80 is released to open position by a key-controlled means, such as shown in U.S. Patent 2,884,188, the key for which is under control of secured personnel. Such a vault is accordingly arranged to have its contact 80 closed only by being properly placed in position in the vault housing. Accordingly, once the vault has been positioned, the circuit of the invention insures that no tampering can occur without rendering the system inoperative or indicating by alarm of an audible or visual nature that an irregularity is occurring with respect to the use of the vaults.

It will be understood that certain features and sub-combinations are of utility and may be employed without reference to other features and sub-combinations.

Having thus described the invention, what is claimed is:

1. In a toll collection system having fare receiving and counting means and chute means to carry fares received from the receiving means to any one of a plurality of fare vaults, in combination:
    (a) switch means for selecting any one of a plurality of vaults into which fares are to be deposited;
    (b) means associated with each vault to indicate each said vault is in position to receive fares and to render inoperative said switch selecting means if each said vault is not in position to receive fares;
    (c) guide means in said chute means movable in response to said switch selecting means to guide fares to a selected vault; and
    (d) means responsive to said guide means when in selected position to render operative said fare counting means and to render said fare counting means inoperative if said guide means is not in the selected position.

2. A system according to claim 1, including means for visually indicating the vault selected after the vault is in operative position to receive fares.

3. A system according to claim 1, wherein said guide means includes:
    (a) a movable funnel through which fares are guided from the chute to a selected fare vault;
    (b) motor means for moving said funnel to the selected position,
    (c) means including said switch means for energizing said motor means when the funnel is to be moved, and
    (d) means responsive to the arrival of said funnel at the desired position to de-energize said motor means.

4. A system according to claim 3, wherein said motor means includes a bidirectional motor and the funnel is pivoted on a shaft rotated by said motor means, and means for controlling the rotation of said motor in the direction nearest the desired position of the funnel.

5. A system according to claim 4, wherein said control means includes
    (a) a rotatable detent cam for each of said fare vaults,
    (b) a switch associated with each cam and adapted to be closed by coaction of the detent of the cam and the switch, and
    (c) a shaft for carrying said cams and said funnel, said shaft being rotatable by said motor means.

6. A system according to claim 3 wherein said motor means includes a unidirectional motor and switch means for energizing said motor in response to said selector switch to position said funnel in the desired position and said funnel is pivoted by an eccentric linkage from the unidirectional motor whereby said funnel is spatially oriented to any one of a plurality of angular positions.

7. A system according to claim 6 wherein said switch means for said unidirectional motor includes a single cam having a detent for energizing one of a plurality of switches spaced about said cam, and means for rotating said cam in synchronism with said motor.

8. A system according to claim 7 wherein said preventing means includes switches in series circuit with the electrical power supply, each switch being operatively closed when an associated fare vault is in secure position free from access by unauthorized personnel.

9. A system according to claim 4 wherein said motor is of the low-torque type and thereby incapable of rotating said cams and funnel from rest but being capable of doing so after starting, including, in combination, means for delaying the passage of fares through the chute until the funnel has been positioned to the desired fare vault location.

10. A system according to claim 1 including means for totalizing the fares received, means to indicate the total fare received in the fare vault in operative receiving position, and means responsive to said totalizing means to energize said switch means to guide fares to a different fare vault after a predetermined amount has been deposited in the positioned fare vault.

11. A system according to claim 1 including means automatically responsive to a predetermined timed sequence to automatically select a vault that has not been previously used.

12. A system according to claim 11 including alarm means for indicating when a predetermined number of vaults have been used.

13. A system according to claim 12 wherein each vault includes key-operated means for rendering the vault operative in said system and alarm means responsive to the attempted use of a vault which has not been rendered operative.

References Cited

UNITED STATES PATENTS

| | | |
|---|---|---|
| 1,882,047 | 10/1932 | Thompson. |
| 1,927,996 | 9/1933 | Tratsch. |
| 2,533,654 | 12/1950 | Wilcox _____ 232—12 X |
| 3,092,308 | 6/1963 | Barnhart. |
| 3,104,001 | 9/1963 | Barnhart et al. |
| 3,109,528 | 11/1963 | Barnhart. |

MAYNARD R. WILBUR, Primary Examiner.

G. J. MAIER, Assistant Examiner.

U.S. Cl. X.R.

133—8; 194—2; 232—15; 235—33

PO-1050
(5/69)

UNITED STATES PATENT OFFICE
CERTIFICATE OF CORRECTION

Patent No. 3441716            Dated April 29, 1969

Inventor(s) Herman Lopata

It is certified that error appears in the above-identified patent and that said Letters Patent are hereby corrected as shown below:

In column 1, lines 3 and 4

"Automatic Tool Systems, Inc.,"

should read -- Automatic Toll Systems, Inc., --

SIGNED AND
SEALED
FEB 17 1970

(SEAL)
Attest:

Edward M. Fletcher, Jr.
Attesting Officer

WILLIAM E. SCHUYLER, JR.
Commissioner of Patents